J. A. C. RUFFNER.
Carriage Axle.
No. 86,693.
Patented Feb. 9, 1869.
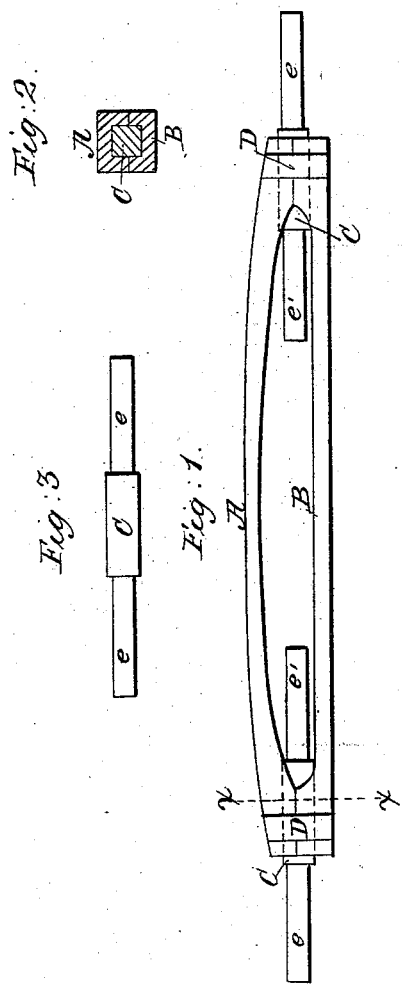
Witnesses
A. C. Johnston
W. Johnston
Inventor
James A. C. Ruffner
By his attorney J. J. Johnston

JAMES A. C. RUFFNER, OF HILLSDALE, PENNSYLVANIA, ASSIGNOR TO HIMSELF AND WILLIAM N. PROTHERO, OF SAME PLACE.

Letters Patent No. 86,693, dated February 9, 1869.

IMPROVEMENT IN CARRIAGE-AXLES.

The Schedule referred to in these Letters Patent and making part of the same.

*To all whom it may concern:*

Be it known that I, JAMES A. C. RUFFNER, of Hillsdale, in the county of Indiana, and State of Pennsylvania, have invented a new and useful Improvement in Axles for Carriages, &c.; and I do hereby declare that the following is a full, clear, and exact description thereof, reference being had to the accompanying drawings, and to the letters of reference marked thereon.

The nature of my invention consists in providing an axle for carriages, &c., with a detachable and reversible spindle, so arranged, with relation to the axle, that in case one part of the spindle should be broken off, it may be reversed and secured in the axle, and thereby make the broken spindle operative.

To enable others skilled in the art to make and use my invention, I will proceed to describe its construction and operation.

In the accompanying drawings, which form part of my specification—

Figure 1 is a side view of my improvement in axles, provided with a reversible axle.

Figure 2 is a transverse section of the same, when cut through a line, $x$.

Figure 3 is a side view of the reversible spindle.

In the drawings—

A B represent the two parts of the axle, which are held together by means of bands, or clips, D.

The parts A B may be varied in form, to adapt the axle, in form, to the desire of the manufacturer.

The ends of the axles are provided with square openings, adapted to the square parts, C, of the spindle, as indicated in fig. 2.

$e$ and $e'$ represent the spindles of the axles.

As the construction and arrangement of my improvement in axle, and the relation that the several parts bear to each other, will be readily understood from the foregoing description, and by reference to the accompanying drawings, I will therefore proceed to describe its operation, which is as follows:

The axle may be secured to the body of the carriage in any suitable and known manner, and the wheels of the carriage held in place on the spindle by any known means.

In case the spindle $e$ is broken off, or otherwise becomes inoperative, the band or clip D is removed, and the spindle changed in the axle, so as to bring the spindle $e'$ to take the place of the spindle $e$; the band or clip D is replaced, and the axle is again made operative.

The great advantage of having the axle of a carriage so constructed that it can be so easily repaired, will be very apparent to the manufacturer of carriages, and those using the same.

Having thus described the nature, construction, and operation of my improvement,

What I claim as of my invention, is—

Providing the axle of a vehicle with spindles which may be detached and reversed, as herein described, and for the purpose set forth.

J. A. C. RUFFNER.

Witnesses:
A. C. JOHNSTON,
S. L. LOWRY.